April 5, 1932.    R. SCHROEDER    1,852,824
PICKER FOR LOOMS
Filed June 8, 1927
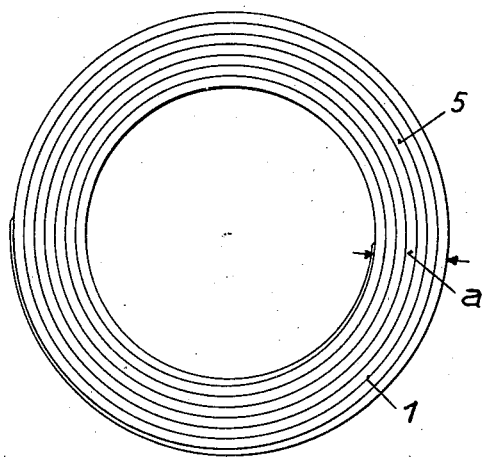
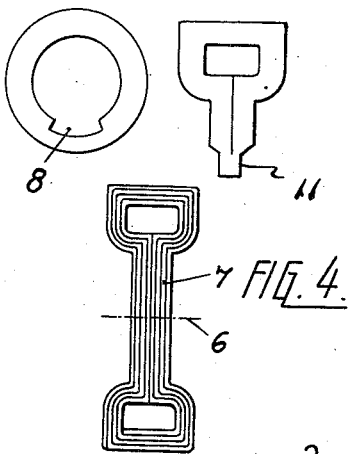
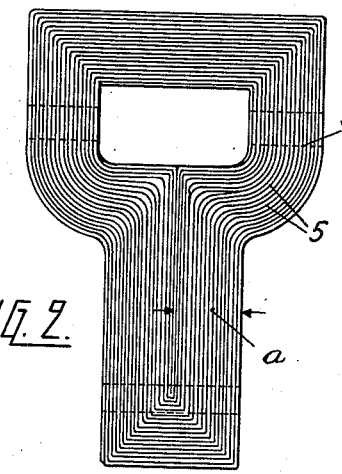
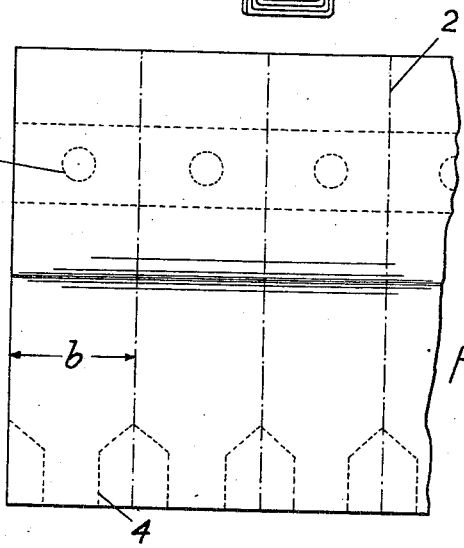
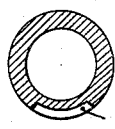
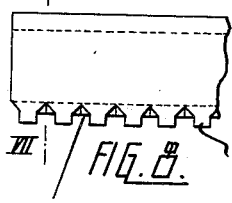
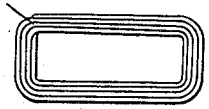
Inventor:
Richard Schroeder Patented Apr. 5, 1932

1,852,824

UNITED STATES PATENT OFFICE

RICHARD SCHROEDER, OF BERLIN, GERMANY, ASSIGNOR TO GENERAL ELECTRIC COMPANY, A CORPORATION OF NEW YORK

PICKER FOR LOOMS

Application filed June 8, 1927, Serial No. 197,306, and in Germany November 27, 1926.

My invention relates to laminated pickers for looms and consists in constructing the picker from laminæ of fibrous compounds, preferably woven textile cloth, the laminæ being adherently united together by means of artificial resin, preferably an artificial resin capable of being hardened. The laminæ may be more or less saturated with this binding medium and run in a more or less closed path or circuit, e. g. in convolute or spiral form.

In the preferred construction, a web of fibrous material saturated or coated with artificial resin capable of being hardened is coiled or rolled to form closed hollow rolls or rings and, if necessary, is shaped by subsequent pressure at a temperature suited to the binding medium, so that the ring or roll is formed into the shape of a picker or can be readily used as such after slight machining.

Rings or rolls similarly made and suitably shaped may also be sub-divided simply by being cut out through the axis so as to form pickers ready for use, or which can be adapted for use as pickers by a slight machining operation.

Preferably, the rings or hollow rolls are not coiled or rolled singly, but collectively, the tubes being made of such length and cross-section that each section at right angles to the axis of the tube produces a ring of the desired shape, and afterwards sub-divided.

Pickers of suitable cross-sectional shape can be at once wound to the proper shape upon a mandrel whose external contour is the same, or approximately the same, in shape and size as the internal contour of the picker, the coiled body being thereafter subjected to the action of heat or the combined action of heat and pressure. The simplest method of carrying out this process is, for instance, to form hollow coiled tubes, for example of square cross-section, and then to cut these hollow tubes into sections which are used for under-pickers. Pickers of more complicated shape are, however, preferably made by a hollow roll or wound tube of simple cross-sectional shape first being formed, its circumference and wall thickness being suited to the dimensions of the picker to be manufactured. For example, a plain cylindrical tube is pressed into the required cross-sectional shape and hardened to the necessary degree.

Provision may be made for recesses, holes or the like in the finished picker either during the winding process, or by treatment of the coiled body before the pressing operation, so that any subsequent work on the picker is thus wholly avoided or materially simplified.

Pickers consisting of parallel layers of cloth and wire cloth suitably alternated with one another and united together with artificial resin are already known, but the improved pickers in accordance with the present invention materially excel such known pickers.

Their excellence may be primarily due to the fact that, at important portions, there is no disturbance of the intimate union between the cloth layers by the use of metal insertions. In addition, the conditions to which the artificial resin is subjected during the winding process are particularly adapted to yield a final product of high elasticity. Thus, any gas which, during the binding process, is already present between the laminæ or generated by the synthetic resin, is squeezed out of the wound body at the point where the web runs on to it, so that during the final curing of the wound body, no bubbles or blow holes are formed.

The improved picker possesses great homogeneity and its specific weight is low. Moreover, the webs running in a closed path ensures the stresses being well transmitted through the body of the picker.

The high elasticity is appreciably advantageous at the very exposed shuttle striking face, whilst the great strength, in particular the bending resistance, is chiefly of importance at the guide holes for the picking spindle. The abrasion due to the sliding friction enlarges the holes in the picker even after long use only by a few thousandths of an inch. Thus the possibility of the picker becoming canted is very slight, therefore ensuring the proper guiding of the picker in the slides. The picker is thus completely prevented from springing-out and throwing the shuttle out of its race. The high resistance to bending prevents the picker from being torn across at the weakest points, viz., where the picking strap is attached and where the picker is perforated. On account of this great strength, the thickness of the walls of the picker may also be made less than those in common use, thus saving material and weight. An important advantage is also that the new pickers are absolutely resistant to oil and heat, if an oil-resisting binding medium, e. g., a phenolformaldehyde condensation product, is used.

Quite apart from all the mechanical advantages, the improved picker has however the great advantage over the ordinary raw-hide picker almost exclusively in common use, that the capital outlay is reduced to a minimum. Raw-hide pickers must, for example, be kept about a year in oil and then stored in a dry place for a very long time in order to remove the excess of oil. This troublesome, laborious and costly treatment is quite unnecessary for pickers made according to the present invention, because the picker is immediately ready for use as soon as it has been made and can always be used at any time; it does not age or crack and never alters at all.

The accompanying drawings illustrate embodiments of the invention and shows one method of manufacture of the pickers. Fig. 1 is a cross-section of a wound tube. Figs. 2 and 3 show the same tube respectively in end view and elevation after it has been pressed into the shape of the ordinary overpicker or picker used in overpick motion looms. Fig. 4 shows the section of a tube after the pressing operation, each section of which forms two pickers united together at the toes.

Figs. 5 and 6 show a similar tube in side view respectively before and after the pressing operation, the tube being machined before the pressing operation. Figs. 7 and 8 show, in section and side views respectively, a tube which is machined before the pressing operation to produce a slightly different type of picker. Figs. 9 and 10 show an oblong ring for an underpicker respectively in plan and in section at right angles to the shuttle race.

In Figs. 1 and 2, 1 designates a cylindrical tube wound from cloth with artificial resin as the adhesive or binding medium. The thickness $a$ of this tube is equal to half the breadth of the body of the picker (Fig. 2) and its circumference is equal to the periphery of the picker (after allowing for variations in the pressing and baking operations). After the tube has been pressed into the shape shown in Fig. 2 and has been baked to the necessary degree, it is cut along the lines 2 in Fig. 3 into separate portions or sections of the thickness $b$ of the picker. The sections form the finished picker after the holes 3 and notches 4 (shown in broken lines in Fig. 3) have been formed therein before or after cutting up the tube, the cut faces being smoothed if necessary. The spiral line 5 in Figs. 1 and 2 indicate the spiral formation of the continuous web before and after the shaping of the tube.

Fig. 4 shows a figure 8 section far formed from a tube, which when cut into sections provides pairs of pickers united together along the line 6. The spiral line 7 indicates the spiral formation of the continuous web in this case.

In order to provide the picker with a fillet, ledge or projection 11 (Fig. 6) during the pressing operation, the tube 1 may, as shown in Fig 5, have a groove 8 cut in it lengthwise, the breadth and depth of the groove being such as to leave a ledge, fillet or projection 11 of the desired size.

In Figs. 7 and 8, the wound tube is constructed in a somewhat different way so that, during the pressing operation, ledges or fillets or projections are formed at the end of the pickers, these fillets or ledges however being situated in the direction of the warp. For this purpose, notches 9 are formed, being segmentally cut in the outside of the tube at right angles to its axis and at intervals equal to the thickness $b$ of a picker, the cross section of these notches being equal to the space between each pair of fillets or ledges 12. The moulding press is fitted with fillets or ledges or ribs to correspond with the notches 9 so that, after the tube has been moulded to shape in the press and has been cut along the lines VII—VII after baking, a picker of the desired contour or outline is obtained.

Figs. 9 and 10 illustrate a web of cloth wound into the form of a substantially rectangular hollow prism, which may be used as an under-picker in under-pick-motion looms.

My invention is, of course, not limited to the exact details of construction and operation since obvious modifications within the scope of this invention may be made by a person skilled in the art.

I claim:—

1. The method of manufacturing pickers for looms, which comprises winding, upon a cylindrical mandrel, a web of woven fabric treated with a resinous condensation product into a hollow tubular body, forming a segmental recess in a wall of said hollow tubular body, and then modifying the cross-section of said hollow body by a pressing operation to produce a pickerlike body having a projecting ledge.

2. The method of making pickers for looms which comprises winding a continuous strip of woven textile cloth of a width to form a number of pickers and treated with a resinous condensation produce to form a tube, forming a segmental recess in a wall of said tube, compressing the tube and subjecting it to heat to cause the tube to assume the shape of a picker having a projecting ledge and to cure the resinous condensation product, and dividing the structure thus formed transversely into individual pickers.

In testimony whereof I affix my signature.
RICHARD SCHROEDER.